(12) United States Patent
Frasier

(10) Patent No.: US 6,571,509 B2
(45) Date of Patent: Jun. 3, 2003

(54) RODENT POISON FEEDER

(76) Inventor: Kenneth L. Frasier, 300 Anita Dr., Gadsden, AL (US) 35901

(*) Notice: Subject to any disclaimer, the term of this patent is extended or adjusted under 35 U.S.C. 154(b) by 0 days.

(21) Appl. No.: 10/113,668

(22) Filed: Apr. 3, 2002

(65) Prior Publication Data

US 2002/0178648 A1 Dec. 5, 2002

Related U.S. Application Data

(60) Provisional application No. 60/294,635, filed on Jun. 1, 2001.

(51) Int. Cl.[7] .............................................. A01M 25/00
(52) U.S. Cl. ....................................................... 43/131
(58) Field of Search .......................... 43/131; D30/199; D22/119

(56) References Cited

U.S. PATENT DOCUMENTS

| | | | |
|---|---|---|---|
| 1,274,123 A | * | 7/1918 | Wigginton .................... 43/131 |
| 1,325,069 A | | 12/1919 | Young |
| 1,579,512 A | * | 4/1926 | Bushong ...................... 43/131 |
| 1,964,611 A | * | 6/1934 | Watson ........................ 43/131 |
| 1,994,859 A | * | 3/1935 | Langum ....................... 43/131 |
| 2,239,937 A | * | 4/1941 | Smith .......................... 43/131 |
| 2,480,724 A | * | 8/1949 | Feussner ...................... 43/131 |
| 2,568,168 A | * | 9/1951 | Query ......................... 43/131 |
| 2,635,382 A | * | 4/1953 | Kuntz ......................... 43/131 |
| 2,650,451 A | * | 9/1953 | Karstedt ...................... 43/131 |
| 2,683,326 A | | 7/1954 | Gardner |
| 2,714,780 A | * | 8/1955 | Glover ........................ 43/131 |
| 2,781,607 A | * | 2/1957 | Smiley ........................ 43/131 |
| 2,896,362 A | * | 7/1959 | Wingate ...................... 43/131 |
| 2,912,788 A | * | 11/1959 | Hargrove ..................... 43/131 |
| 2,944,364 A | | 1/1960 | Kelly |
| 2,964,871 A | * | 12/1960 | Hoffman ...................... 43/131 |
| 3,008,262 A | * | 11/1961 | Ronicker ..................... 43/131 |
| 3,269,052 A | * | 8/1966 | Barnhart ...................... 43/131 |
| 3,298,128 A | * | 1/1967 | Dill et al. ..................... 43/131 |
| 3,517,454 A | * | 6/1970 | Query ......................... 43/131 |
| 4,277,907 A | * | 7/1981 | Ernest ......................... 43/131 |
| 4,349,982 A | * | 9/1982 | Sherman ...................... 43/131 |
| 4,541,198 A | * | 9/1985 | Sherman ...................... 43/131 |
| 4,570,377 A | * | 2/1986 | Primavera .................... 43/131 |
| 4,831,775 A | | 5/1989 | Sherman |
| 6,151,828 A | * | 11/2000 | Genero et al. ................ 43/131 |
| 6,216,384 B1 | * | 4/2001 | Dickson et al. .............. 43/131 |

* cited by examiner

Primary Examiner—Charles T. Jordan
Assistant Examiner—Joan M. Olszewski
(74) Attorney, Agent, or Firm—Richard C. Litman

(57) ABSTRACT

A gravity flow, dry poison dispenser for rodents for use in homes, barns, factories, and gardens. The dispenser is a box like enclosure with a hinged lid that is filled from the top. The granular poison material flows to a storage area at the bottom as needed. The bottom of the dispenser is inclined toward the back to prevent rodents from spilling the poison in surrounding area. Rodents can access the decoyed poison in the storage area by simply inserting their heads through a hole. Spikes and side mounts are proposed for placement of flower beds and for permanent attachment to walls, respectively.

13 Claims, 5 Drawing Sheets

RODENT POISON FEEDER

CROSS-REFERENCE TO RELATED APPLICATION

This application claims the benefit of U.S. Provisional Patent Application Serial No. 60/294,635, filed Jun. 1, 2001.

BACKGROUND OF THE INVENTION

1. Field of the Invention

The present invention relates to bait dispensers. More particularly, the present invention relates to a poison dispenser for rodents.

2. Description of Related Art

Rodents have long been a pest problem in agriculture. It would be desirable to provide a poison rodent bait station which is simple and inexpensive in design, has a self replenishing feeding area such as from a self-contained bin, and is so configured as to maintain the poison in the feeding area while avoiding spillage to the outside where nontargeted animals and children may gain access to the poison.

U.S. Pat. No. 4,831,775, issued May 23, 1989, to Sherman describes a spill resistant rodent bait station. The bait station is a box like structure having two portals for the entry and exit of rodents. The device includes a trap door and an inclined floor.

U.S. Pat. No. 1,325,069, issued Dec. 16, 1919, to Young describes a poison holder and decoy including rodent passages in a horizontal plate that lead to a bottom storage compartment containing poisoned food.

U.S. Pat. No. 2,683,326, issued Jul. 13, 1954, to Gardner et al., describes a rodent exterminating device having a base with a floor plate, a hinged cover, and a feeder mounted on the base, thereof.

U.S. Pat. No. 2,944,364, issued Jul. 12, 1960, to Kelly, describes a boxlike rodent exterminating device having a gravity feeder structure and a lockable rop for refilling.

None of the above inventions and patents, taken either singly or in combination, is seen to describe the instant invention as claimed.

SUMMARY OF THE INVENTION

The present invention is a gravity flow, dry poison dispenser for rodents for use in homes, barns, factories, and gardens. The dispenser is a box like enclosure with a hinged lid that is filled from the top. The granular poison material flows to a storage area at the bottom as needed. The bottom of the dispenser is inclined toward the back to prevent rodents from spilling the poison in surrounding area. Rodents can access the decoyed poison in the storage area by simply inserting their heads through a hole. Spikes and side mounts are proposed for placement in flower beds and for permanent attachment to walls, respectively.

Accordingly, it is a principal object of the invention to provide a box like rodent poison feeder which avoids spillage outside the feeder by dining rodents.

It is another object of the invention to provide a rodent poison feeder as above which is easily replenished with poison.

It is a further object of the invention to provide a rodent poison feeder which self feeds poison from an upper storage area to the dining area as the poison is consumed.

Still another object of the invention is to provide a rodent poison feeder as above having an inner lower wall which slopes away from a rodent feeding aperture such that the poison will not be spread outside the feeder by visiting rodents.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
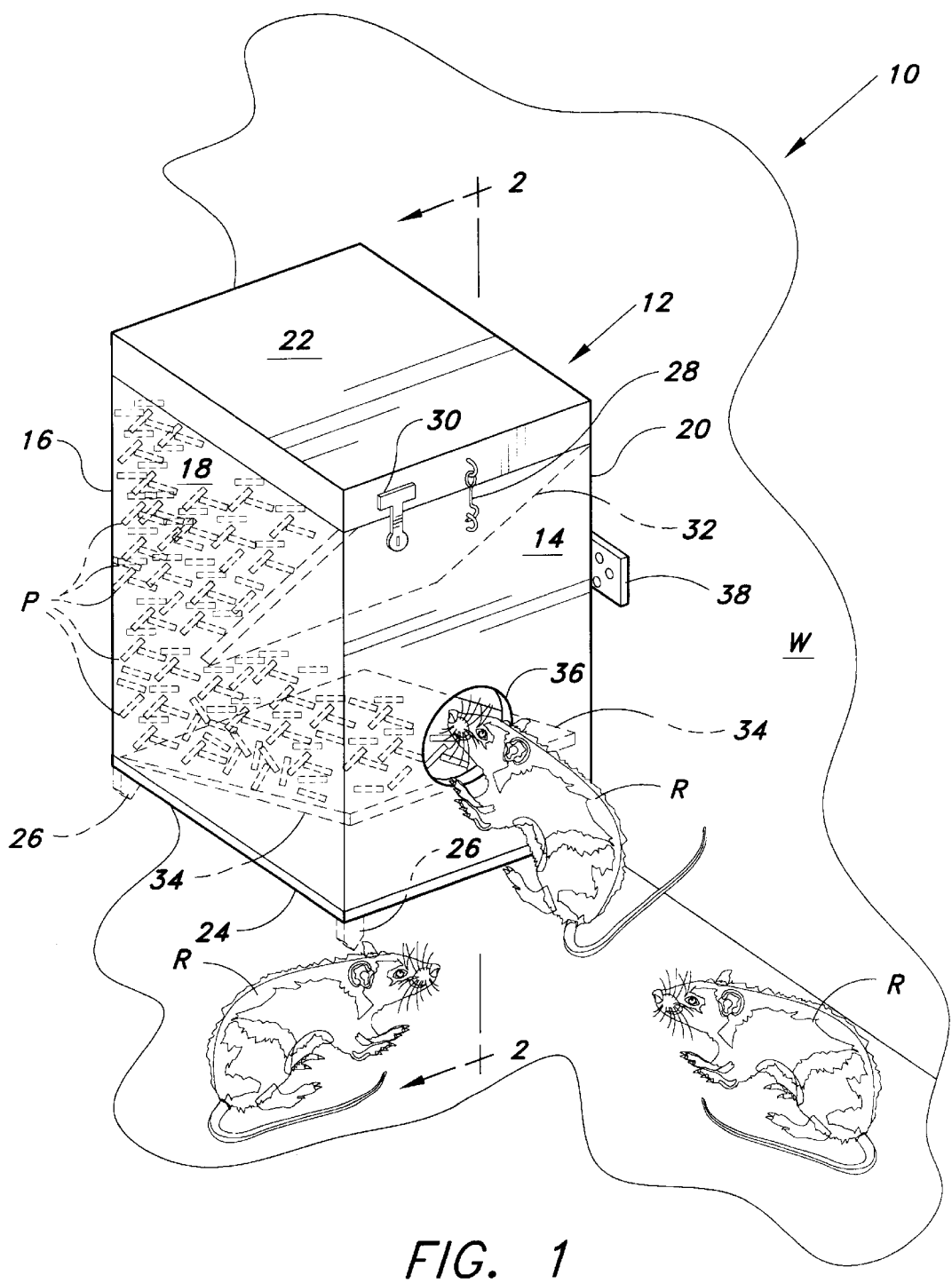
FIG. 1 is an environmental, perspective view of a rodent poison feeder according to the present invention.
Figure 2:
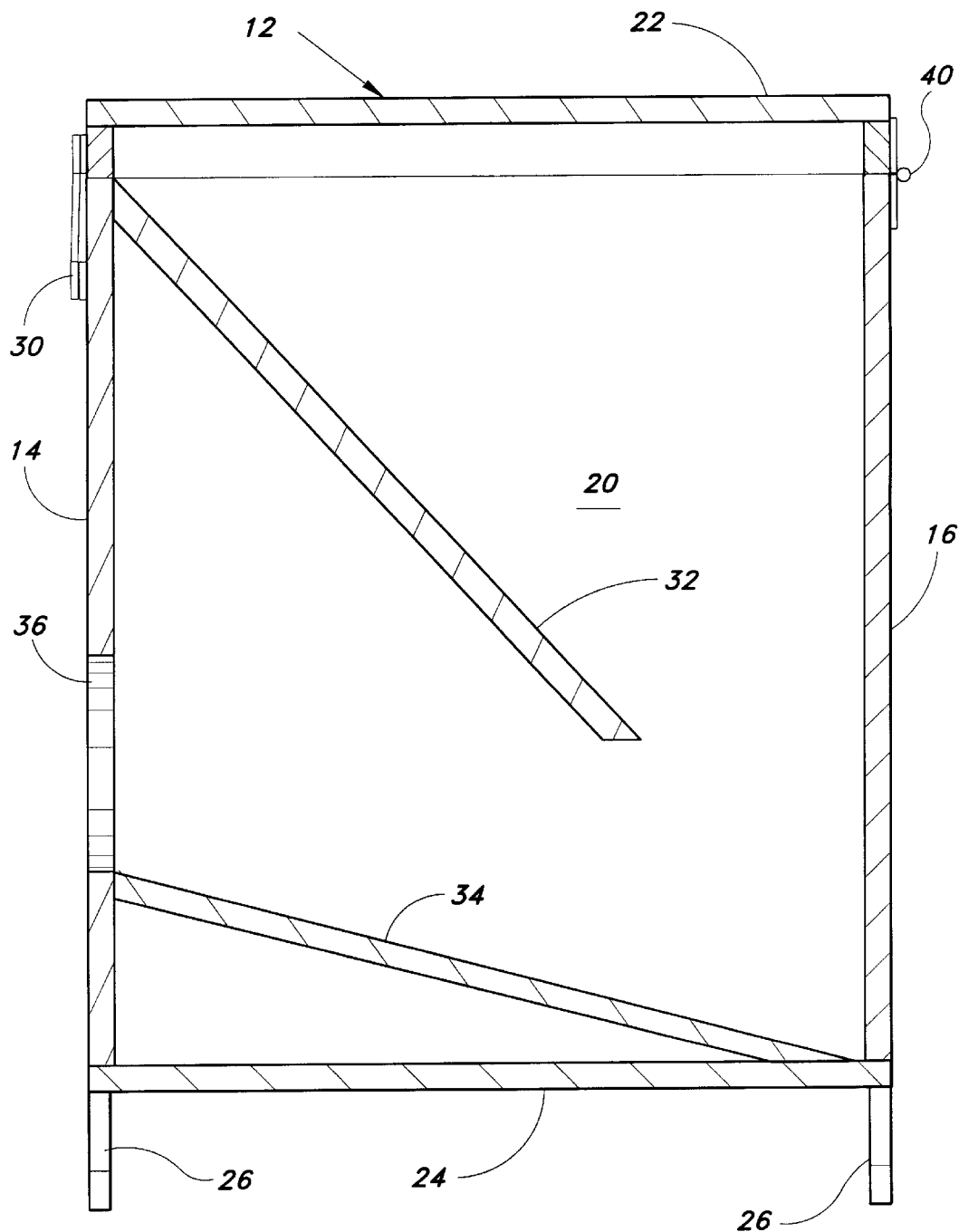
FIG. 2 is a sectional view in elevation of the rodent poison feeder according to the present invention.
Figure 3:
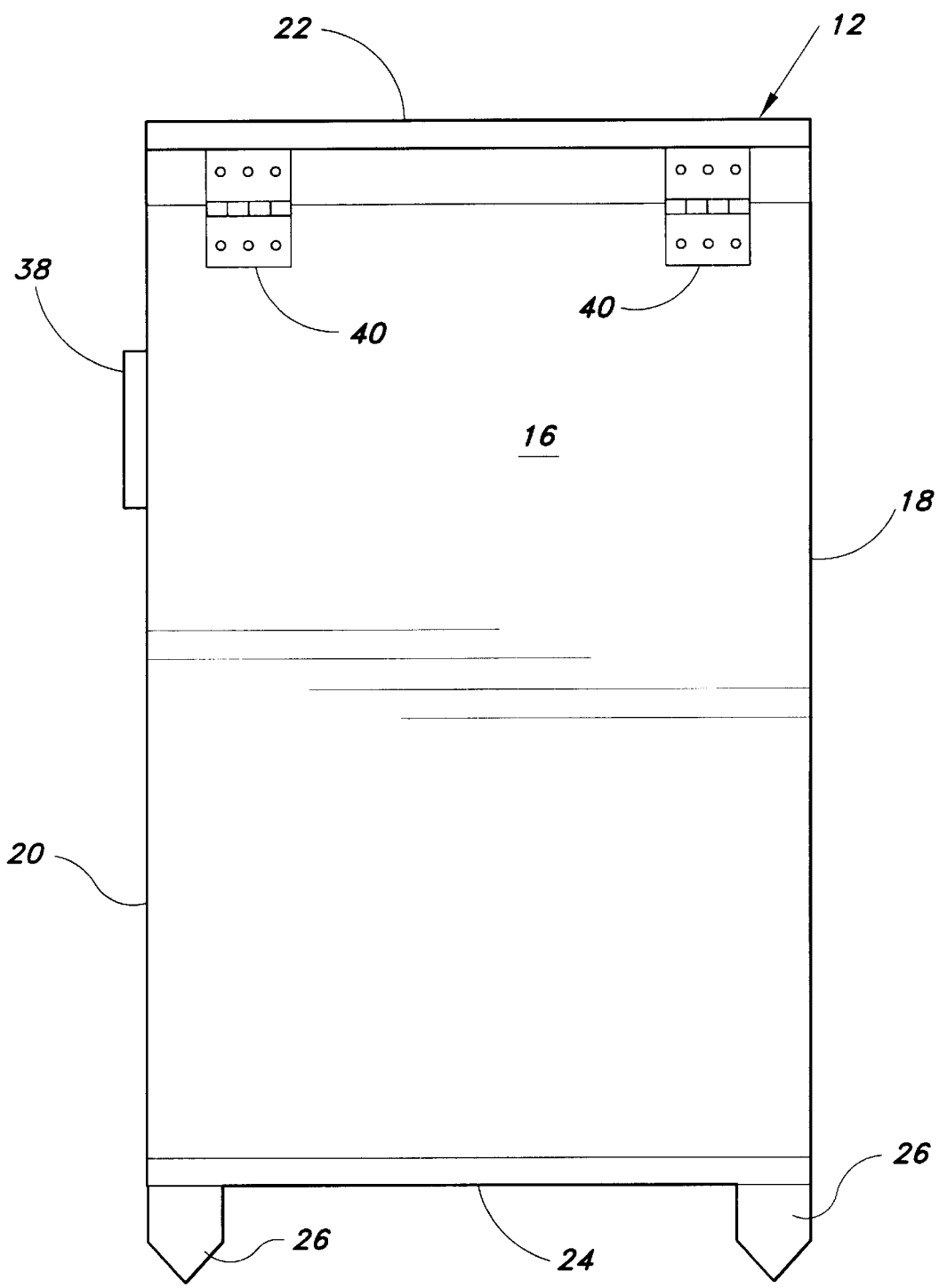
FIG. 3 is a back view in elevation of the feeder of FIG. 1 having stakes at its bottom wall.
Figure 4:
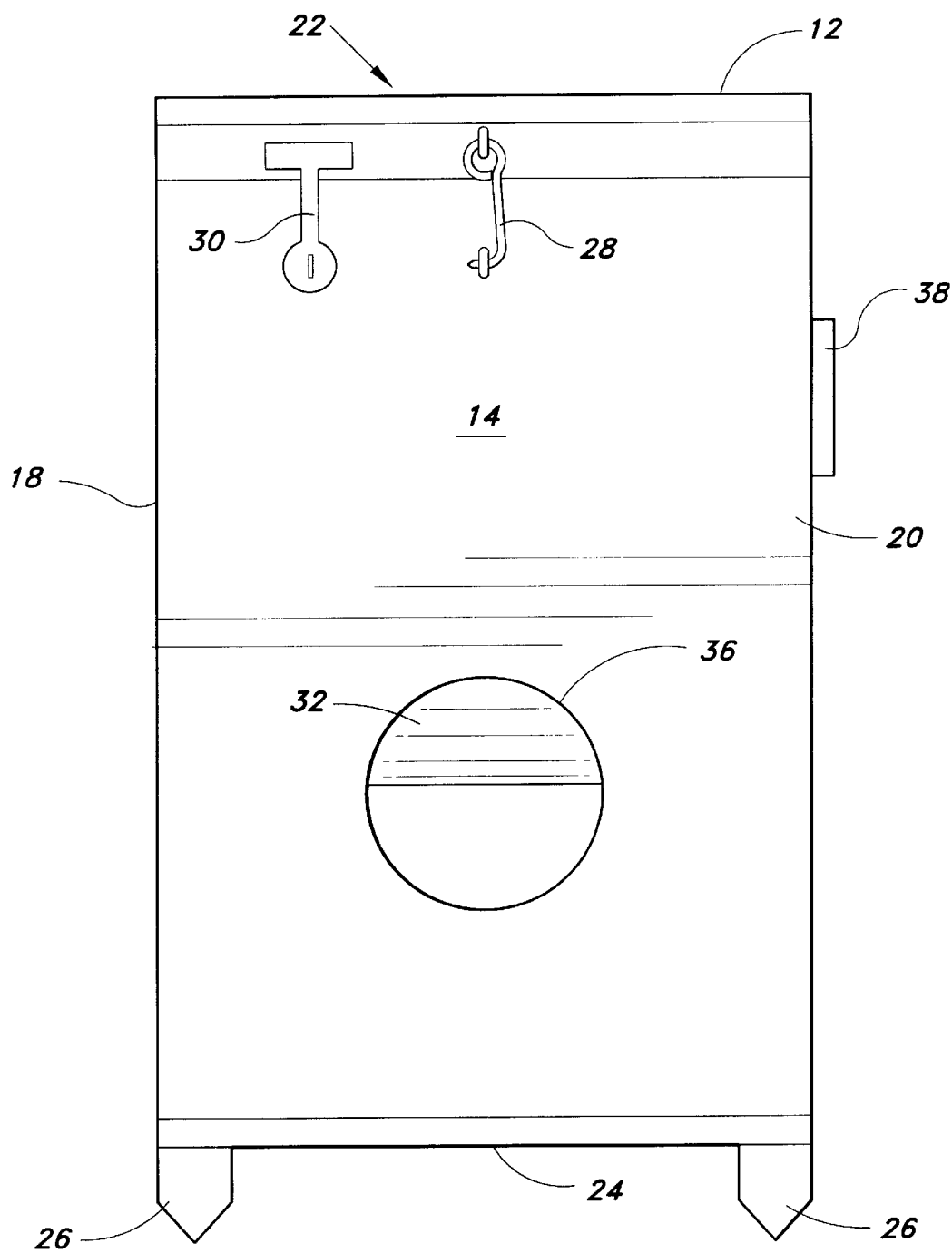
FIG. 4 is a front view of the rodent poison feeder of FIG. 1 showing a lid closure latch and a lock.
Figure 5:
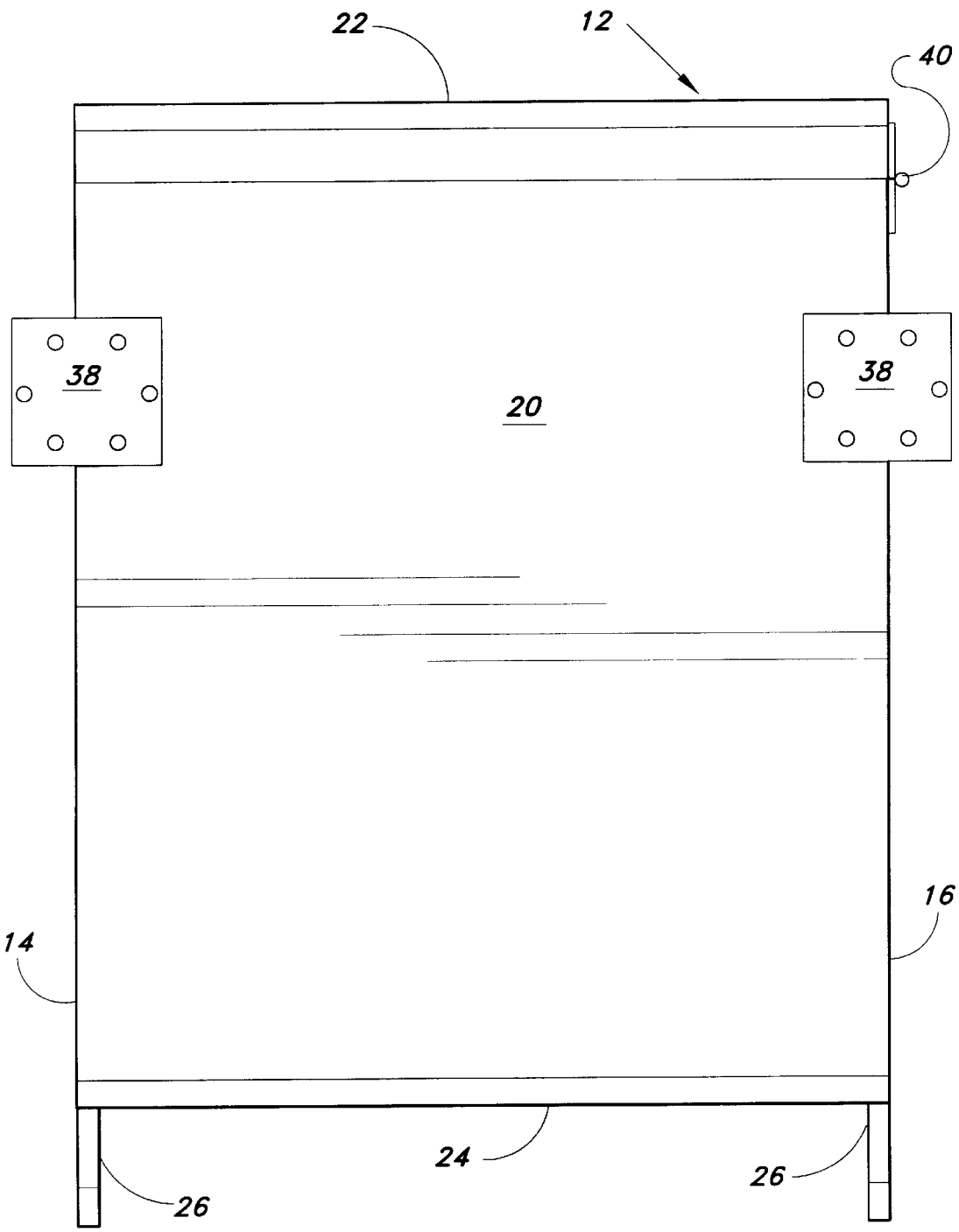
FIG. 5 is a side view of the rodent poison feeder of FIG. 1 showing fixtures for permanent placement in a location.

The present invention is a gravity flow, dry poison dispenser for rodents for use in homes, barns, factories, and gardens. The dispenser is a box like enclosure with a hinged lid that is filled from the top. The granular poison material flows to a storage area at the bottom as needed. The bottom of the dispenser is inclined toward the back to prevent rodents from spilling the poison in the surrounding area. Rodents can access the decoyed poison in the storage area by simply inserting their heads through a hole. Spikes and side mounts are proposed for placement of flower beds and for permanent attachment to walls, respectively.

Referring to FIGS. 1–5, there is shown a perspective, environmental view and elevational wall views, respectively of the inventive poison feeder. Poison feed station system 10 includes a generally rectangular bait box 12. Bait box 12 comprises front wall 14 and back wall 16 connected with first sidewall 18 and second sidewall 20, and hinged lid 22 opposite base 24. Base 24 features grounding stakes 26 for fixing bait box 12 to the earth. Lid latch 28 and lid lock 30 secure hinged lid 22 at front wall 14. Internal structure of bait box 12 includes chute wall 32 extending between first sidewall 18 and second sidewall 20 and sloping downward from front wall 14 at its intersection with hinged lid 22 to a point spaced from back wall 16 so as to form a poison supply chute. Floor 34 is laterally coextensive with chute wall 32 and slopes downward from poison feeding window 36 and terminating at the intersection of back wall 16 and base 24. Mounting brackets 38 are mounted on second sidewall 20 and extend outward therefrom to provide for mounting on environmental wall W. Lid hinges 40 (see FIGS. 2–3) attach lid 22 to back wall 16, allowing the rotation of lid 22 relative to back wall 16. In its normal position, lid 22 is horizontal and rests on front wall 14 and first and second side walls 18 and 20 in the closed position, while being secured by latch 28 and lock 30 cooperating with front wall 14.

In operation, the lid latch 28 and lid lock 30 are opened, allowing the user to manually tilt up lid 22 around hinges 40. Poison P is then introduced in an amount to fill the chute formed by chute wall 32 in concert with sidewalls 18 and 20 and back wall 16 up to the level of the intersection of lid 22 with the four walls. In this process poison P drains onto sloping floor 34 until it reaches the level of poison feeding window 36, which may be an appropriately sized bore in front wall 14. The relative positions of chute wall 32, back wall 16, sloping floor 34 and window 36 are so chosen that the natural angle of repose of the poison P allows the poison to form a feeding pile just reaching the intersection of the floor 34, front wall 14 and poison feeding window 36. Once filled, the lid is secured in a closed position by latch 28 and lock 30 and left alone.

Eventually, rodents R discover the dining opportunities the bait poison P presents and partake in turn as illustrated in FIG. 1. As poison P is consumed by rodents R, the remaining poison re-assumes its natural angle of repose, thus allowing replenishment from the storage chute. The sloping floor 34 mitigates against poison P being spilled or scattered out to the immediate vicinity of the bait box 12 so as to avoid non-target animals and children immediate access to the poison P. The rodents R, once satiated leave the immediate area, having had their final meal.

In cases where bait box 12 is installed on a hard floor, grounding stakes 26 may be deleted from the invention. In this circumstance it is desirable to permanently attach bait box 12 to environmental wall W by means of mounting brackets 38. The lock 30 may be deleted from the invention if there is no possibility of children accessing the area of bait box 12.

Bait box 12 may be constructed from any convenient material, such as sheet metal, wood, or plastic.

Although any desired dimensions may be used in the construction of the inventive poison feeder, preferred internal dimensions include a 5½ inch square lid, eight inch walls, and a floor sloping from a point about 1½ to two inches along the front wall above the floor to the intersection of the floor and the back wall. The chute wall extends from the intersection of the lid and the front wall and slopes along 5½ inches to terminate 1 inch from the back wall and 2 ⅝ inches above the sloping floor, thus forming the chute outlet. The grounding stakes are from 1½ to 2 inches in length. The feeding window bore is from 1¼ to 1 ¾ inches in diameter, about 1½ to 2 inches from the base, and laterally centrally located in the front wall.

It is to be understood that the present invention is not limited to the embodiments described above, but encompasses any and all embodiments within the scope of the following claims.

I claim:

1. A gravity flow, dry poison dispenser for rodents comprising:
   a) a front wall having a top edge, a back wall, a first sidewall, a second sidewall, a base, and a hinged lid collectively forming a box like enclosure;
   b) a chute wall extending between said first and said second sidewalls and sloping downward from said top edge of said front wall to a point spaced from said back wall;
   c) said front wall defining a feeding window spaced from said base at an elevation; and
   d) a floor extending between said first and said second sidewalls and sloping downward from said front wall, said floor having a first end spaced from said base at substantially the same elevation as said feeding window and a second end extending to said back wall.

2. The dispenser according to claim 1, further comprising a plurality of grounding stakes extending downward from said base for securing said dispenser in an earth location.

3. The dispenser of claim 2, wherein said grounding stakes are from about 1½ to about 2 inches in length.

4. The dispenser of claim 1, further comprising mounting brackets attached to and extending from one of said first and said second sidewalls for permanent attachment to an environmental wall.

5. The dispenser of claim 4, further comprising mounting brackets attached to and extending from one of said first and said second sidewalls for permanent attachment to an environmental wall.

6. The dispenser of claim 1, further comprising at least one hinge attached between said hinged lid and said back wall for rotational attachment therebetween.

7. The dispenser of claim 1, further comprising a latch attached between said hinged lid and said front wall for securing said hinged lid in a closed position during use while allowing the opening of said hinged lid for re-supplying poison feed to said dispenser.

8. The dispenser of claim 1, further comprising a lock attached between said hinged lid and said front wall for securing said hinged lid in a closed position and denying entry to other persons such as children while allowing the unlocking and opening of said hinged lid by those having a key or knowing a combination for re-supplying poison feed to said dispenser.

9. The dispenser of claim 1, wherein its internal dimensions are include an about 5½ inch square lid, eight inch high walls, and a floor sloping from a point about 1½ to two inches along said front wall above the floor to the intersection of the floor and the back wall.

10. The dispenser of claim 1, wherein said chute wall extends from the intersection of said lid and said front wall and slopes along about 5½ inches to terminate about 1 inch from the back wall and about 2⅝ inches above the sloping floor, thereby forming said chute outlet.

11. The dispenser of claim 1, wherein said feeding window is from about 1¼ to about 1¾ inches in diameter, about 1½ to about 2 inches from said base, and laterally centrally located in said front wall.

12. A gravity flow, dry poison dispenser for rodents comprising:
   a) a front wall having a top edge, a back wall, a first sidewall, a second sidewall, a base, and a hinged lid collectively forming a box like enclosure;
   b) means defining a chute for storing and feeding poison to a feeding area;
   c) said front wall defining a feeding window spaced from said base; and
   d) a floor extending between said first and said second sidewalls and sloping downward from said front wall, said floor having a first end spaced from said base at substantially the same elevation as said feeding window and a second end extending to said back wall.

13. The dispenser of claim 12, wherein said chute comprises a chute wall extending between said first and said second sidewalls and sloping downward from said top edge of said front wall to a point spaced from said back wall.

* * * * *